(12) United States Patent
Eriksson et al.

(10) Patent No.: US 9,096,229 B2
(45) Date of Patent: Aug. 4, 2015

(54) METHOD AND SYSTEM FOR CONTROLLING A VEHICLE CRUISE CONTROL

(75) Inventors: Anders Eriksson, Torslanda (SE); Johan Bjernetun, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 13/381,957

(22) PCT Filed: Jul. 2, 2009

(86) PCT No.: PCT/SE2009/050862
§ 371 (c)(1),
(2), (4) Date: Feb. 22, 2012

(87) PCT Pub. No.: WO2011/002367
PCT Pub. Date: Jan. 6, 2011

(65) Prior Publication Data
US 2013/0030668 A1    Jan. 31, 2013

(51) Int. Cl.
*B60W 30/14* (2006.01)
*B60W 10/06* (2006.01)
*B60W 10/11* (2012.01)

(52) U.S. Cl.
CPC .............. *B60W 30/143* (2013.01); *B60W 10/06* (2013.01); *B60W 10/11* (2013.01); *B60W 2550/143* (2013.01); *B60W 2550/402* (2013.01); *B60W 2720/103* (2013.01)

(58) Field of Classification Search
CPC ................. B60W 2550/142; B60W 2550/402; B60W 30/143; B60W 2720/10–2720/103; B60W 10/06; B60W 10/11; Y02T 10/52; B60K 31/047
USPC .......................................................... 701/93
See application file for complete search history.

(56) References Cited

U.S. PATENT DOCUMENTS 5,832,400 A * 11/1998 Takahashi et al. ............... 701/53
5,839,534 A * 11/1998 Chakraborty et al. ........ 180/169

(Continued)

FOREIGN PATENT DOCUMENTS

DE    102006001818 A1    7/2007
DE    102008038078 A1    5/2008

(Continued)

OTHER PUBLICATIONS

Hellstrom, E. 11Look-ahead Control of Heavy Trucks utilizing Road Topography, 2007: Lie thesis, Linkoping University. LiU-TEK-LIC-2007:28, Thesis No. 1319, ISBN 978-91-85831-58-6, figure 7.5, abstract, paragraphs 6.2.7 2 2.

(Continued)

*Primary Examiner* — Fadey Jabr
*Assistant Examiner* — Courtney Heinle
(74) *Attorney, Agent, or Firm* — WRB-IP LLP

(57) ABSTRACT

A method and a vehicle cruise control system performing the steps of driving with the cruise control active and set to maintain a set target speed, registering a first position when driving in an uphill slope of a hill where vehicle retardation has decreased vehicle speed to a first speed below the set target speed and where the retardation has decreased to zero or acceleration has just started in order to increase speed to the set target speed, registering a desired speed in a second position downhill of the crest at a first distance after the crest, based on the desired speed calculating a minimum speed at the crest with which the vehicle has to pass the crest in order to be able to reach the desired speed with zero fuel consumption during the first distance, controlling speed between the first position and the crest so that the vehicle reaches the minimum speed when passing the crest.

12 Claims, 4 Drawing Sheets

(56) References Cited

U.S. PATENT DOCUMENTS

| | | | |
|---|---|---|---|
| 5,868,214 A * | 2/1999 | Workman | 180/179 |
| 5,944,766 A * | 8/1999 | White | 701/94 |
| 5,979,582 A * | 11/1999 | Håkansson et al. | 180/170 |
| 6,076,622 A * | 6/2000 | Chakraborty et al. | 180/169 |
| 6,370,472 B1 * | 4/2002 | Fosseen | 701/102 |
| 6,374,173 B1 * | 4/2002 | Ehlbeck | 701/93 |
| 6,990,401 B2 | 1/2006 | Neiss et al. | |
| 2003/0221886 A1 * | 12/2003 | Petrie, Jr. | 180/170 |
| 2004/0068359 A1 * | 4/2004 | Neiss et al. | 701/96 |
| 2005/0026747 A1 * | 2/2005 | Steen et al. | 477/78 |
| 2005/0085974 A1 * | 4/2005 | Hedman et al. | 701/51 |
| 2006/0293822 A1 * | 12/2006 | Lattemann et al. | 701/51 |
| 2009/0037069 A1 * | 2/2009 | Inoue et al. | 701/94 |
| 2009/0088941 A1 * | 4/2009 | Tsuchiya et al. | 701/93 |
| 2009/0259354 A1 * | 10/2009 | Krupadanam et al. | 701/22 |
| 2010/0004848 A1 * | 1/2010 | Transou, Jr. | 701/110 |
| 2010/0049400 A1 * | 2/2010 | Duraiswamy et al. | 701/35 |
| 2010/0152990 A1 * | 6/2010 | Bjernetun et al. | 701/93 |
| 2011/0246042 A1 * | 10/2011 | Tomokuni et al. | 701/93 |
| 2012/0101698 A1 * | 4/2012 | Eriksson et al. | 701/53 |
| 2012/0271524 A1 * | 10/2012 | Eriksson et al. | 701/93 |
| 2012/0283928 A1 * | 11/2012 | Bjernetun et al. | 701/93 |

FOREIGN PATENT DOCUMENTS

| | | | | |
|---|---|---|---|---|
| EP | 1494887 A1 | 10/2007 | | |
| WO | WO 03/084776 | * | 10/2003 | B60K 41/06 |

OTHER PUBLICATIONS

International Search Report for corresponding International Application PCT/SE2009/050862.

International Preliminary Report on Patentability for corresponding International Application PCT/SE2009/050862.

Hellstrom, E. 11Look-ahead Control of Heavy Trucks utilizing Road Topography, 2007, Lie thesis, Linkoping University, LiU-TEK-LIC-2007:28, Thesis No. 1319, ISBN 978-91-85831-58-6, figure 7,5, abstract, paragraphs 8.2.7.2.2.

* cited by examiner

METHOD AND SYSTEM FOR CONTROLLING A VEHICLE CRUISE CONTROL

BACKGROUND AND SUMMARY

The present invention relates to a method for controlling a cruise control in a vehicle. The invention also relates to a vehicle cruise control system intended for such method for controlling said cruise control.

The present invention also relates to a computer program, computer program product and a storage medium for a computer all to be used with a computer for executing said method.

Motor vehicles, such as cars, lorries, towing vehicles and buses, are often provided with a so-called cruise control system, also denominated speed control system, for automatically controlling the vehicle speed. Such a cruise control system comprises means, such as a speed sensor, for monitoring the actual vehicle speed. The cruise control system compares the actual vehicle speed with a set target speed. The target speed may for instance be entered into the cruise control system as the prevailing actual vehicle speed when a set switch is actuated by the driver. The cruise control system generates an error signal by comparing the actual vehicle speed with the target speed. The error signal is then for instance used to control an actuator coupled to the fuel pump or to the vehicle throttle in order to change the engine speed until the error signal is substantially zero, i.e. until the actual vehicle speed is equal to the target speed.

EP1439976 and U.S. Pat. No. 6,990,401 disclose two examples of prior art where the cruise control system has been further developed. Here the cruise control system is a predictive cruise control system utilizing information about current vehicle position and upcoming road topography, that is for example gradients or elevation values for the coming road, in order to control throttle opening in such a way as to increase fuel efficiency.

It is desirable to further develop such a cruise control system where information about current vehicle position and upcoming road topography is used by the cruise control for controlling vehicle speed.

The method according to an aspect of the invention is a method for controlling a cruise control during driving of a vehicle. Said method comprising the steps of:
  driving said vehicle with said cruise control active and set to maintain a vehicle set target speed;
  registering a first vehicle position when driving in an uphill slope of a hill where vehicle retardation has decreased vehicle speed to a first vehicle speed below said vehicle set target speed and where said retardation has decreased to zero or the vehicle has just started to accelerate in order to increase vehicle speed to said vehicle set target speed;
  registering a desired vehicle speed in a second position downhill of said crest at a first distance after said crest;
  based on said desired vehicle speed calculating a minimum vehicle speed at said crest with which said vehicle has to pass said crest in order to be able to reach said desired vehicle speed with a minimized or zero fuel consumption during said first distance;
  controlling vehicle speed during a second distance between said first vehicle position and said crest so that said vehicle reaches said minimum vehicle speed when passing said crest, and where a vehicle speed is maintained below said vehicle set target speed during said second distance.

According to a first alternative embodiment of said invention said second vehicle position is one of;
  a predetermined vehicle traveling time from said crest,
  a predetermined distance from said crest,
  at the end of said downhill,
  at a distance from said crest where a vehicle traveling resistance is estimated to change from negative to positive.

According to a further embodiment of said invention said method is characterized in further comprising the step of calculating a needed vehicle acceleration or retardation during said second distance in order to reach said minimum vehicle speed at said crest with a minimized fuel consumption during said second distance.

According to another embodiment of said invention said method is characterized in further comprising the steps of:
  registering said first vehicle speed being just below a direct gear engagement vehicle speed;
  when having registered a predetermined vehicle condition setting said minimum vehicle speed to equal said direct gear engagement vehicle speed and accelerating the vehicle up to said minimum vehicle speed and engaging a direct gear;
  driving said vehicle with said direct gear engaged during remaining of said second distance.

According to a further embodiment of the invention said predetermined vehicle condition comprises at least one of:
  said just below a direct gear engagement vehicle speed meaning a speed difference below 5 km/h between said direct gear engagement vehicle speed and said first vehicle speed;
  said second distance is greater than a predetermined value;
  an estimated time interval for driving said vehicle with said direct gear engaged during said second distance is greater than a predetermined value.

In another embodiment of the invention a maximum vehicle over speed is set for said vehicle cruise control, and where said maximum vehicle over speed is at least equal to or higher than said vehicle set target speed, and where said desired vehicle speed equals said maximum vehicle over speed.

According to another embodiment of the invention a minimum vehicle under speed is set, having a predetermined relation to said vehicle set target speed. According to a further embodiment said predetermined relation is one of:
  said minimum vehicle under speed is a predetermined percentage of said vehicle set target speed;
  said minimum vehicle under speed is a predetermined amount below said vehicle set target speed.

In a further embodiment of the invention said crest, said second position and said minimum vehicle speed are predicted with information about present vehicle position and coming road topography of said hill.

According to a further embodiment of the invention if said second distance is shorter than a predetermined value, then said minimum vehicle speed is set to be equal to said first vehicle speed.

The invention also relates to a vehicle cruise control system that comprises (includes, but is not necessarily limited to) a control unit, driver input interface, vehicle position identifying device, road topography identifying device. Said system is characterized in that said control unit is arranged to perform the above mentioned method steps and use information from said vehicle position identifying device and said road topography identifying device in order to calculate said minimum vehicle speed.

Further advantageous embodiments of the invention emerge from the dependent patent claims following patent claim 1.

BRIEF DESCRIPTION OF THE DRAWINGS

The present invention will be described in greater detail below with reference to the accompanying drawings which, for the purpose of exemplification, shows further preferred embodiments of the invention and also the technical background, and in which.

DETAILED DESCRIPTION

A cruise control system for automatically controlling the vehicle speed can be arranged in a vehicle according to known art. Said cruise control system comprises a control unit for continually processing input signals and deliver output signals to, for example a propulsion unit control for controlling a propulsion unit and/or a brake control unit for controlling braking devices in said vehicle in order to maintain a set vehicle speed. Said vehicle cruise control system further comprises at least a driver input interface, vehicle position identifying device and road topography identifying device according to known art. Said control unit is arranged to perform steps of below described inventive functions with the use of information from said vehicle position identifying device and said road topography identifying device. Examples of road topography identifying device are route identifying devices and electronic map devices.

Figure 1:
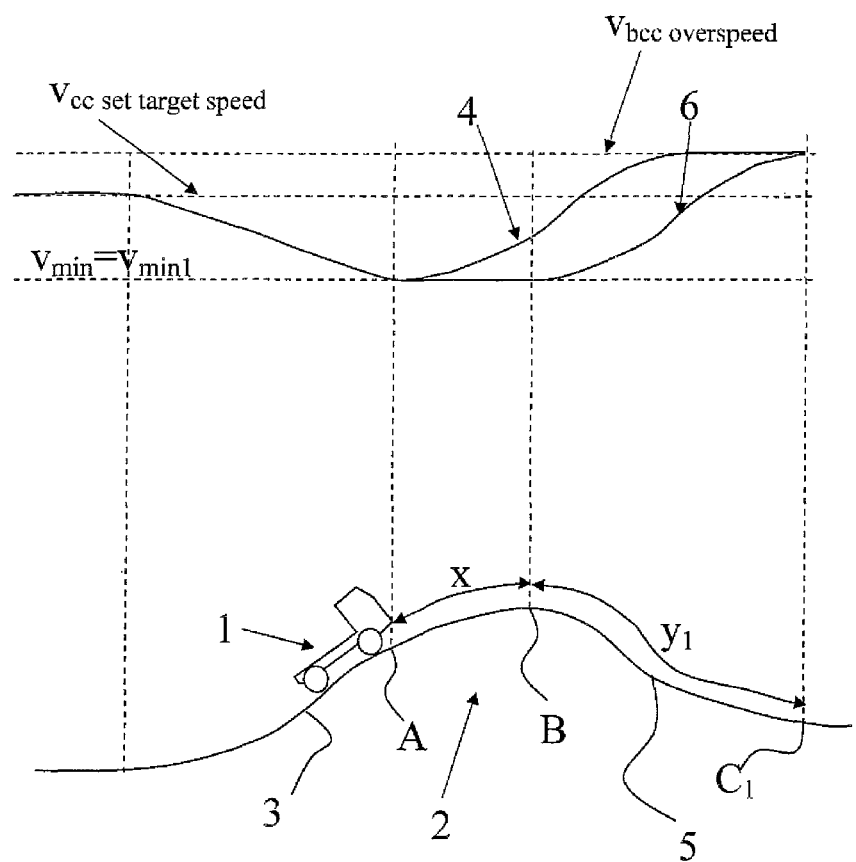
FIGS. 1 to 3 diagrammatically show vehicle speed diagrams and corresponding driving conditions, and where said speed diagrams discloses cruise control according to different embodiments of the invention.

FIG. 1 discloses a vehicle 1, which travels over a hill 2. A cruise control in said vehicle is set to maintain $v_{cc\ set\ target\ speed}$. Thus, said control unit in said cruise control system is arranged to maintain said $v_{cc\ set\ target\ speed}$. A maximum vehicle over speed $v_{bcc\ overspeed}$ is also set in order for the control unit to initiate braking of said vehicle if vehicle speed approaches said $v_{bcc\ overspeed}$. This functionality is known as such and is also called brake cruise control. Said maximum vehicle over speed $v_{bcc\ overspeed}$ for said vehicle cruise control can be set to be at least equal to or higher than said vehicle set target speed. In the shown example $v_{bcc\ overspeed}$ is higher than $v_{cc\ set\ target\ speed}$. When the vehicle starts climbing said hill the vehicle speed eventually starts to decrease from said $v_{cc\ set\ target\ speed}$ due to incline of the uphill slope 3 and/or heavy loaded vehicle and/or lack of propulsion power, even though the propulsion unit of the vehicle delivers full power during uphill traveling. Eventually the incline of the uphill slope 3 starts to decrease and at a certain position A the vehicle retardation has decreased to zero. From position A and onwards the full power delivered by the propulsion unit is enough to start to accelerate the vehicle. Thus, vehicle speed starts to increase at position A. Position A also indicates where a minimum vehicle speed $v_{min}$ occurred during the traveling over said hill 2. According to known art and without knowledge of a coming crest at position B or the following downhill slope 5 said control unit will simply control said propulsion unit in order to regain $v_{cc\ set\ target\ speed}$ as soon as possible. Speed curve 4 discloses an example of this. Said curve 4 indicates that $v_{cc\ set\ target\ speed}$ is reached somewhere just after said position B. Since, after the position B, the vehicle is traveling downwards the inclination of the downhill slope 5 further accelerates the vehicle passed said $v_{cc\ set\ target\ speed}$ and up to said $v_{bcc\ overspeed}$. Thus, said control unit will initiate braking in order not to over speed said $v_{bcc\ overspeed}$. A more fuel efficient way of controlling the vehicle speed when traveling over said hill 2 would be according to curve 6. In order to be able to control the vehicle speed according to curve 6 said control unit has to have access to information about coming traveling route, such as in the mentioned prior art examples EP1439976 and U.S. Pat. No. 6,990,401. The present invention relates to a further development of such a predictive cruise control system.

Referring to FIG. 1 and according to an embodiment of the invention said control unit in said cruise control system is programmed to drive said vehicle with said cruise control active and set to maintain a vehicle set target speed $v_{cc\ set\ target\ speed}$, and to perform the following steps:

registering a first vehicle position A when driving in said uphill slope 3 of said hill 2 where vehicle retardation has decreased vehicle speed to a first vehicle speed $v_{min}$ below said vehicle set target speed and where said retardation has decreased to zero or the vehicle has just started to accelerate in order to increase vehicle speed to said vehicle set target speed;

registering a desired vehicle speed (in the shown example $v_{bcc\ overspeed}$) in a second position $C_1$ downhill of said crest at a first distance $y_1$ after said crest B;

based on said desired vehicle speed calculating a minimum vehicle speed $v_{min1}$ at said crest with which said vehicle has to pass said crest B in order to be able to reach said desired vehicle speed with a minimized or zero fuel consumption during said first distance $y_1$;

controlling vehicle speed during a second distance x between said first vehicle position A and said crest B so that said vehicle reaches said minimum vehicle speed $v_{min1}$ when passing said crest.

Thus, the control unit will accelerate the vehicle during said second distance x only enough so that gravitational force during said first distance $y_1$ in the downhill slope 5 can accelerate the vehicle up to said desired vehicle speed. In this way braking of the vehicle during said downhill 5 and vehicle acceleration during said second distance x can be minimized. Note that in the example shown in FIG. 1 said first vehicle speed $v_{min}$ is calculated to be equal to said minimum vehicle speed $v_{min1}$, thus the acceleration will be zero during said second distance x. As can be noted the vehicle speed is maintained below said vehicle set target speed during said second distance x.

Figure 2:
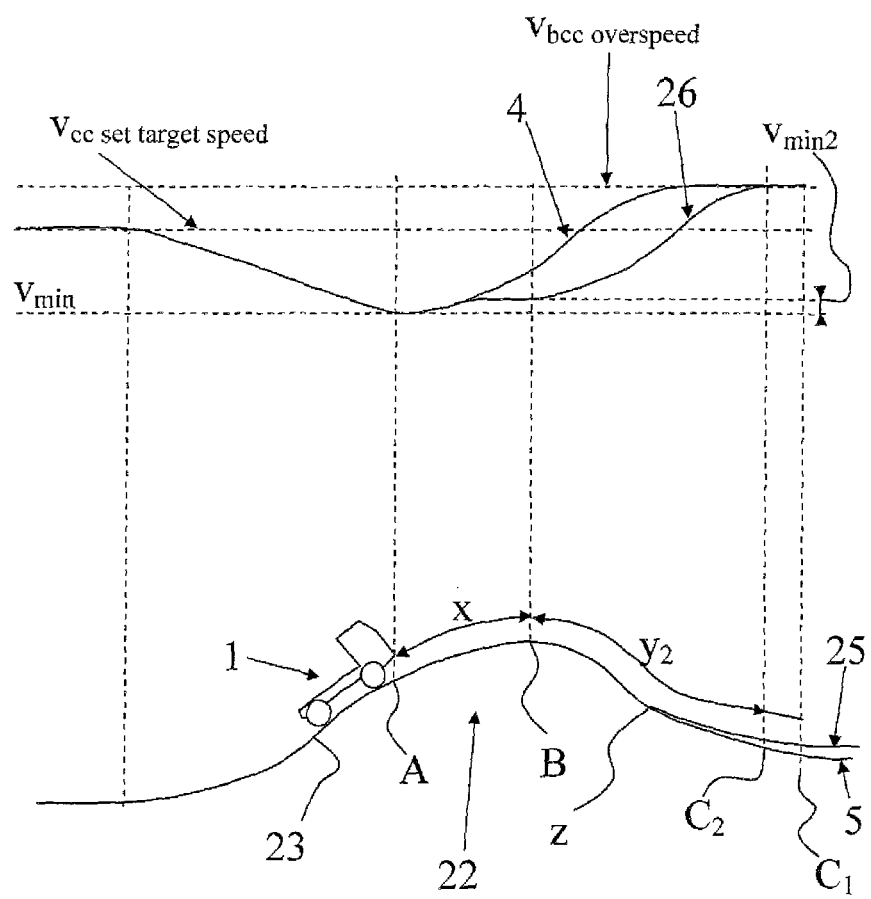

FIG. 2 discloses another hill 22, which is identical to the hill 2 in FIG. 1 the first two thirds of the hill, that is up to a position z in the downhill slope 25. Said downhill slope 25 levels out faster than said downhill slope 5. As can be seen said downhill slope 5 with its said first position $C_1$ has also been drawn in FIG. 2 for easier comparison. When said invention is applied on the hill 22 shown in FIG. 2 said control unit will register a first vehicle position A that is the same as for said hill 2. The same value for a first vehicle speed $v_{min}$ is registered. Said control unit further registers a desired vehicle speed (also here $v_{bcc\ overspeed}$) for a second position $C_2$ downhill of said crest at a first distance $y_2$ after said crest B. Thus, since this downhill slope levels out earlier this first distance $y_2$ is shorter compared to $y_1$ and consequently said $C_2$ is positioned higher up compared to $C_1$. This means that said desired vehicle speed has to be reached earlier compared to the example shown in FIG. 1. Said control unit calculates a minimum vehicle speed $v_{min2}$ at said crest based on said desired vehicle speed at position $C_2$, which speed has to be slightly higher compared to $v_{min1}$ in order to be able to reach said desired vehicle speed at $C_2$. Said control unit will then control vehicle speed during a second distance x (which is equal to distance x in FIG. 1) between said first vehicle position A and said crest B so that said vehicle reaches said minimum vehicle speed $v_{min2}$ when passing said crest. In the example in FIG. 2 this means that the vehicle will be accelerated from $v_{min}$ to $v_{min2}$. The control of the vehicle speed according to the invention is in FIG. 2 illustrated by curve 26.

The benefit is that acceleration between position A and B is minimized and adapted to a coming downhill slope. Thus, coming downhill slopes are more effectively used for regaining vehicle speedup to desired vehicle speed. This leads to an decreased fuel consumption.

If the downhill slope had been steeper than said downhill slope 5 said control unit would have calculated a minimum vehicle speed for said crest B that is lower than said first vehicle speed $v_{min}$ at position A. Thus, the vehicle would have to be retarded during said second distance x. In a further embodiment of the invention it is possible to set a minimum vehicle under speed. Said minimum vehicle under speed can be set manually or automatically by the control unit. Said control unit can be programmed to set said vehicle under speed with a predetermined relation to said vehicle set target speed $v_{cc\,set\,target\,speed}$. Said predetermined relation can be one of for example:
  said minimum vehicle under speed is a predetermined percentage of said vehicle set target speed;
  said minimum vehicle under speed is a predetermined amount of km/h below said vehicle set target speed.

According to a further embodiment of the invention said second vehicle position $C_1$ or $C_2$ can be one of;
  a predetermined vehicle traveling time from said crest B,
  a predetermined distance from said crest,
  at the end of said downhill,
  at a distance from said crest where a vehicle traveling resistance is estimated to change from negative to positive. The last mentioned is the same position as where the vehicle speed increase falls to zero. In the FIGS. 1 to 3, $C_1$ or $C_2$ is aiming at illustrating such positions.

In a further embodiment of the invention said control unit can be programmed to further perform the step of calculating a needed vehicle acceleration or retardation during said second distance x in order to reach said minimum vehicle speed at said crest with a minimized fuel consumption during said second distance. For example as illustrated in FIG. 2 the acceleration up to $V_{min2}$ during distance x occurs mainly during the first half of said distance x. During second half of said distance x vehicle speed $V_{min2}$ is maintain. According to this embodiment of the invention a milder acceleration can be calculated and applied during said distance x, for example said control unit can accelerate the vehicle during whole distance x, that is with a lower acceleration and still reaching $v_{min2}$ at the crest B.

Figure 3:
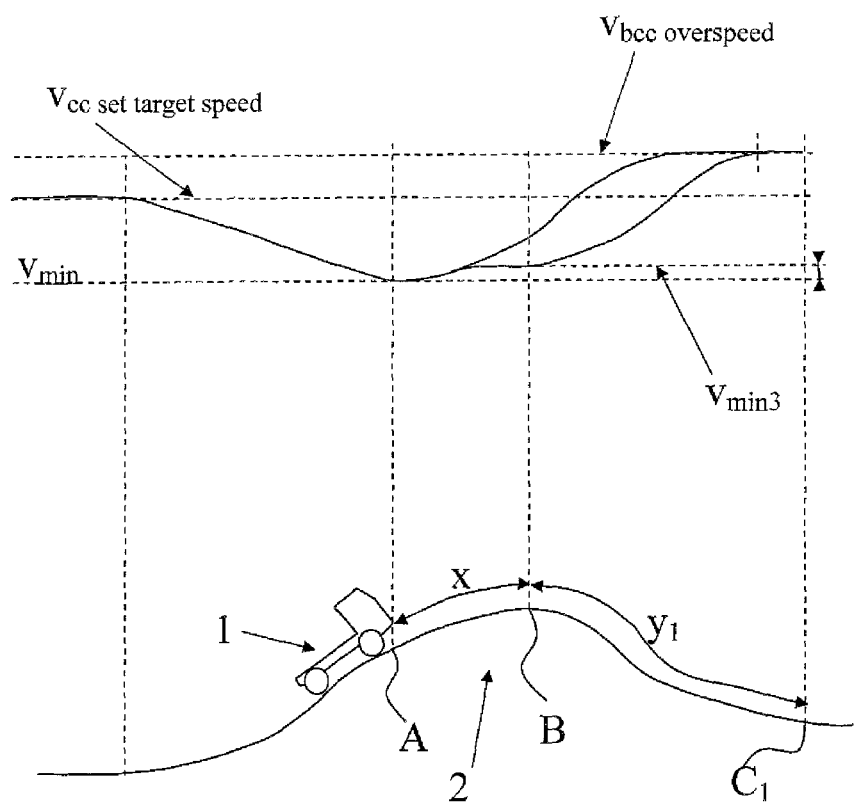

FIG. 3 discloses the same hill 2 as in FIG. 1, thus positions A, B, $C_1$, x and $y_1$ are the same in FIGS. 2 and 3. The same $v_{cc\,set\,target\,speed}$ and $v_{bcc\,overspeed}$ are used in both examples.

A vehicle can comprise a propulsion unit drivingly connected to driven wheels of said vehicle via a transmission. A step geared transmission can comprise an input shaft, an intermediate shaft, which has at least one toothed gear meshing with a toothed gear on the input shaft, and main shaft with toothed gears, which mesh with toothed gears on the intermediate shaft. The main shaft is then further connected to an output shaft coupled to the driving wheels by way of a propeller shaft, for example. Each pair of toothed gears has a different gear ratio from another pair of gears in the gearbox. Different transmission ratios are obtained in that different pairs of gears transmit the torque from the propulsion unit to the driven wheels. Between two interacting and rotating toothed gears in such a transmission friction losses occur between the teeth of each of the toothed gears which are in engagement.

In some step geared transmissions the highest gear (lowest gear ratio) is a so-called direct gear. This implies that the input shaft and the main shaft (or the output shaft) in the gearbox are directly connected to one another when the direct gear is engaged, which means that the torque is transmitted straight through the transmission without any gearing. It may alternatively be said that the transmission ratio is 1:1. Consequently no losses occur between meshing gears. In other words the direct gear is, all in all, a more fuel-saving gear than the other indirect gears, the transmission ratios of which are obtained through the pairs of toothed gears. EP1494887 discloses an example of prior art with at transmission comprising a direct gear.

In another embodiment of the invention and with reference to FIG. 3 said control unit is besides the above mentioned steps further programmed to perform the following steps:
  registering said first vehicle speed $v_{min}$ being just below a direct gear engagement vehicle speed at said first vehicle position A;
  when having registered a predetermined vehicle condition setting said minimum vehicle speed to equal said direct gear engagement vehicle speed and accelerating the vehicle up to said minimum vehicle speed $v_{min3}$ and engaging a direct gear;
  driving said vehicle with said direct gear engaged during remaining part of said second distance x.

The benefit is that further fuel can be saved by driving said vehicle with a direct gear engaged instead of an indirect gear. There is a fuel cost related to the vehicle acceleration during said distance x. Thus, in order to initiate said acceleration and eventually engagement of said direct gear the right vehicle condition has to prevail, that is the amount of fuel saved by driving part of said distance x with a direct gear engaged must be estimated to be greater than the amount of extra fuel consumed due to said acceleration during distance x. Said predetermined vehicle condition can comprise for example at least one of:
  said just below a direct gear engagement vehicle speed $v_{min3}$ meaning a speed difference below 5 km/h between said direct gear engagement vehicle speed and said first vehicle speed $v_{min}$;
  said second distance x is greater than a predetermined value;
  an estimated time interval for driving said vehicle with said direct gear engaged during said second distance x is greater than a predetermined value.

The values of the three mentioned conditions are predetermined by the manufacturer of the vehicle. In a more advanced embodiment said control unit can be programmed to calculate an estimation of how much fuel that will be consumed if a direct gear is engaged compared to continuing driving with an indirect gear with said $v_{min1}$ up to said crest B. The outcome of said estimation decides if said direct gear will be engaged or not.

Note that in the embodiments mentioned said control unit uses information about both present vehicle position and coming vehicle positions (or road topography of said hill) in order to be able to predict said crest, said second position and said minimum vehicle speed.

Note also that in the mentioned embodiments during traveling said distances $y_1$ or $y_2$ fuel consumption is minimized by said control unit ordering zero propulsion power from the propulsion unit. Zero propulsion power includes for example both a propulsion unit drivingly connected to the driven wheels of the vehicle (for example engine braking) or not drivingly connected, that is for example freewheeling. Thus, only gravitational force accelerates the vehicle during traveling of said distances $y_1$ or $y_2$. Said calculation of minimum vehicle speed at said crest must consider if said propulsion unit will be drivingly connected or not drivingly connected to the driven wheels of the vehicle, since there is a significant difference in vehicle travel resistance between said two cases.

In a further embodiment of the invention said control unit is programmed to equalize said minimum vehicle speed to said first vehicle speed $v_{min}$ if said second distance x is shorter than a predetermined value. The main benefit of this is that further unnecessary accelerations can be avoided.

In a further embodiment the vehicle does not have to be equipped with the possibility to set a maximum vehicle over speed $v_{bcc\ overspeed}$ in order to initiate braking of said vehicle if vehicle speed approaches said $v_{bcc\ overspeed}$. Instead in such a vehicle not equipped with a brake cruise control said desired vehicle speed can be equal to said vehicle set target speed $v_{cc\ set\ target\ speed}$.

Figure 4:
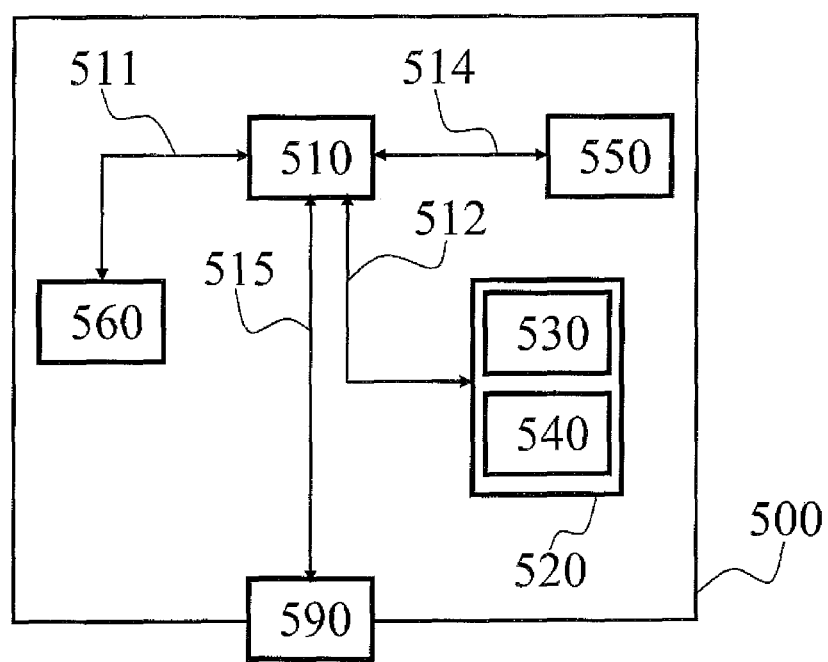
FIG. 4 discloses the invention applied in a computer arrangement.

FIG. 4 shows an apparatus 500 according to one embodiment of the invention, comprising a nonvolatile memory 520, a processor 510 and a read and write memory 560. The memory 520 has a first memory part 530, in which a computer program for controlling the apparatus 500 is stored. The computer program in the memory part 530 for controlling the apparatus 500 can be an operating system.

The apparatus 500 can be enclosed in, for example, a control unit, such as said control unit mentioned above. The data-processing unit 510 can comprise, for example, a microcomputer.

The memory 520 also has a second memory part 540, in which a program for said cruise control system according to the invention is stored. In an alternative embodiment, the program is stored in a separate nonvolatile data storage medium 550, such as, for example, a CD or an exchangeable semiconductor memory. The program can be stored in an executable form or in a compressed state.

When it is stated below that the data-processing unit 510 runs a specific function, it should be clear that the data-processing unit 510 is running a specific part of the program stored in the memory 540 or a specific part of the program stored in the nonvolatile recording medium 550.

The data-processing unit 510 is tailored for communication with the memory 550 through a data bus 514. The data-processing unit 510 is also tailored for communication with the memory 520 through a data bus 512. In addition, the data-processing unit 510 is tailored for communication with the memory 560 through a data bus 511. The data-processing unit 510 is also tailored for communication with a data port 590 by the use of a data bus 515.

The method according to the present invention can be executed by the data-processing unit 510, by the data-processing unit 510 running the program stored in the memory 540 or the program stored in the nonvolatile recording medium 550.

The invention should not be deemed to be limited to the embodiments described above, but rather a number of further variants and modifications are conceivable within the scope of the following patent claims.

The invention claimed is:

1. Method for controlling a vehicle cruise control comprising:
   driving the vehicle with the cruise control active and set to maintain a vehicle set target speed;
   registering, by a processor, a first vehicle position when driving in an uphill slope of a hill where vehicle retardation has decreased vehicle speed to a first vehicle speed below the vehicle set target speed and where the retardation has decreased to zero or the vehicle has just started to accelerate in order to increase vehicle speed to the vehicle set target speed;
   selecting, by a processor, a second position downhill of a crest of the hill and registering, by the processor, a desired vehicle speed in the second position;
   based on the desired vehicle speed calculating a vehicle speed needed at the crest with which the vehicle has to pass the crest in order to be able to reach the desired vehicle speed with a minimized or zero fuel consumption while traveling from the crest to the second position; and
   controlling vehicle speed during a second, non-zero distance between the first vehicle position and the crest so that the vehicle reaches the needed vehicle speed when passing the crest, and maintaining a vehicle speed below the vehicle set target speed during the second distance.

2. The method as claimed in claim 1, wherein the second vehicle position is selected as one of:
   a predetermined vehicle traveling time from the crest,
   a predetermined distance from the crest,
   at the end of the downhill,
   at a distance from the crest where a vehicle traveling resistance is estimated to change from negative to positive.

3. The method as claimed in claim 1, comprising the step of calculating a needed vehicle acceleration or retardation during the second distance in order to reach the needed vehicle speed at the crest with a minimized fuel consumption during the second distance.

4. The method as claimed in the claim 1, comprising the step of:
   registering the first vehicle speed being just below a direct gear engagement vehicle speed at the first vehicle position;
   when having registered a predetermined vehicle condition setting the needed vehicle speed to equal the direct gear engagement vehicle speed and accelerating the vehicle up to the needed vehicle speed and engaging a direct gear;
   driving the vehicle with the direct gear engaged during remaining part of the second distance.

5. The method as claimed in claim 4, wherein the predetermined vehicle condition comprises at least one of:
   the just below a direct gear engagement vehicle speed meaning a speed difference below 5 km/h between the direct gear engagement vehicle speed and the first vehicle speed;
   the second distance is greater than a predetermined value;
   an estimated time interval for driving the vehicle with the direct gear engaged during the second distance is greater than a predetermined value.

6. The method as claimed in claim 1, comprising setting a maximum vehicle over speed for the vehicle cruise control, and where the maximum vehicle over speed is at least equal to or higher than the vehicle set target speed, and where the desired vehicle speed equals the maximum vehicle over speed.

7. The method as claimed in claim 1, comprising setting a minimum vehicle under speed, having a predetermined relation to the vehicle set target speed.

8. The method as claimed in claim 7, wherein the predetermined relation is one of:

the minimum vehicle under speed is a predetermined percentage of the vehicle set target speed;

the minimum vehicle under speed is a predetermined amount below the vehicle set target speed.

9. The method as claimed in claim 1, wherein with information about present vehicle position and coming road topography of the hill predicting the crest, the second position and the needed vehicle speed.

10. The method as claimed in claim 1, wherein if the second distance is shorter than a predetermined value, then the needed vehicle speed is set to be equal to the first vehicle speed.

11. The method as claimed in claim 1, wherein the steps are performed in a sequence such that, first, the first vehicle position is registered, second, the desired vehicle speed in the second position is registered, third, the needed vehicle speed at the crest is calculated, and, fourth, vehicle speed is controlled during the second distance.

12. A vehicle cruise control system comprising a control unit, driver input interface, vehicle position identifying device, road topography identifying device, wherein the control unit is arranged, when a vehicle comprising the cruise control system is driven with the cruise control system active and set to maintain a vehicle set target speed, to control the vehicle cruise control by a method comprising:

registering, by a processor, a first vehicle position when driving in an uphill slope of a hill where vehicle retardation has decreased vehicle speed to a first vehicle speed below the vehicle set target speed and where the retardation has decreased to zero or the vehicle has just started to accelerate in order to increase vehicle speed to the vehicle set target speed;

selecting, by a processor, a second position downhill of a crest of the hill and registering, by the processor, a desired vehicle speed in the second position;

based on the desired vehicle speed calculating a needed vehicle speed at the crest with which the vehicle has to pass the crest in order to be able to reach the desired vehicle speed with a minimized or zero fuel consumption while traveling from the crest to the second position;

controlling vehicle speed during a second, non-zero distance between the first vehicle position and the crest so that the vehicle reaches the needed vehicle speed when passing the crest, and maintaining a vehicle speed below the vehicle set target speed during the second distance.

* * * * *